July 30, 1968   D. J. O'NEILL ET AL   3,394,530
HORIZONTAL EMULSION TREATER
Filed May 9, 1966   3 Sheets-Sheet 1

INVENTORS.
DAVID J. O'NEILL & VERNON LEIKAM
BY
Fishburn and Gold
ATTORNEYS

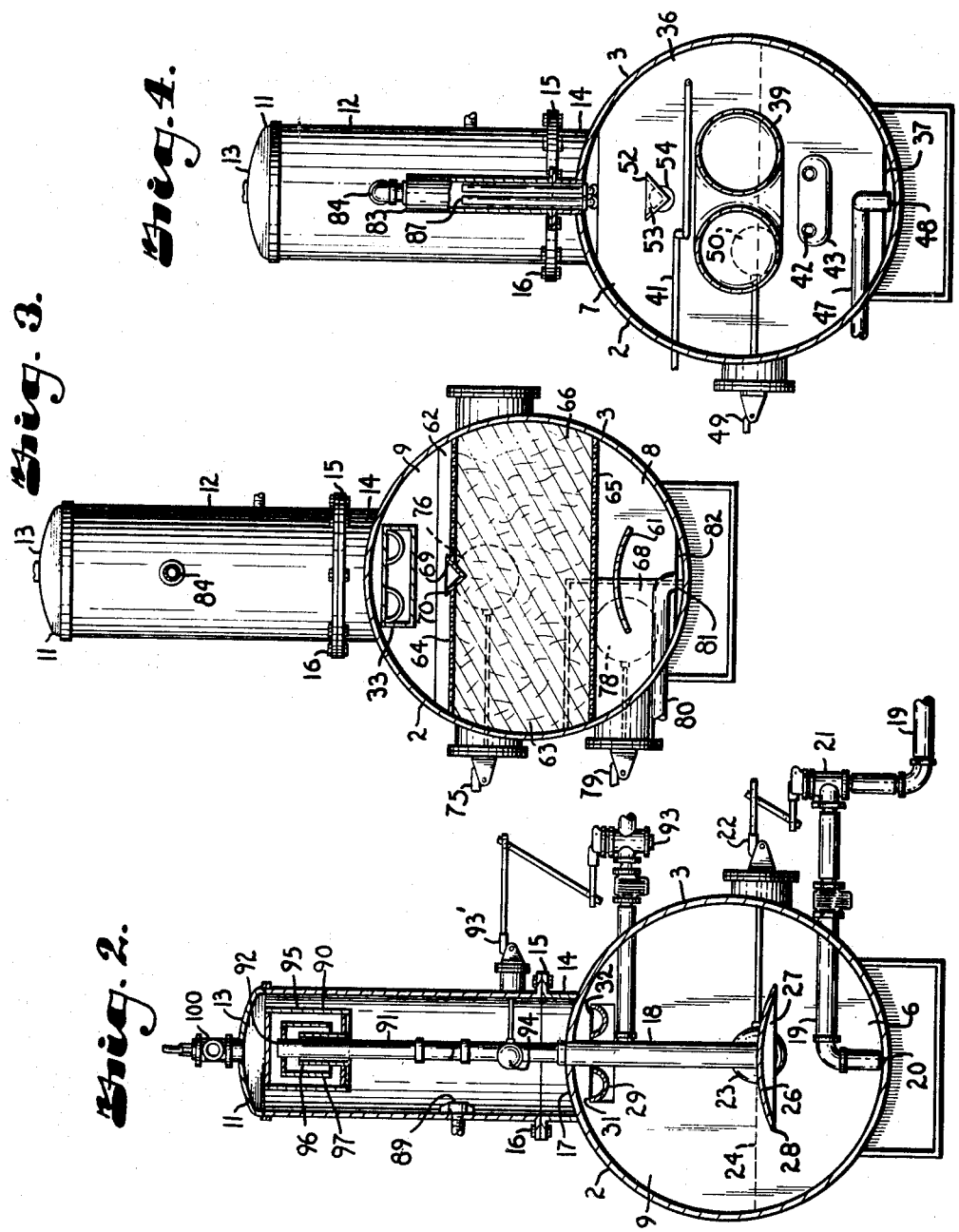

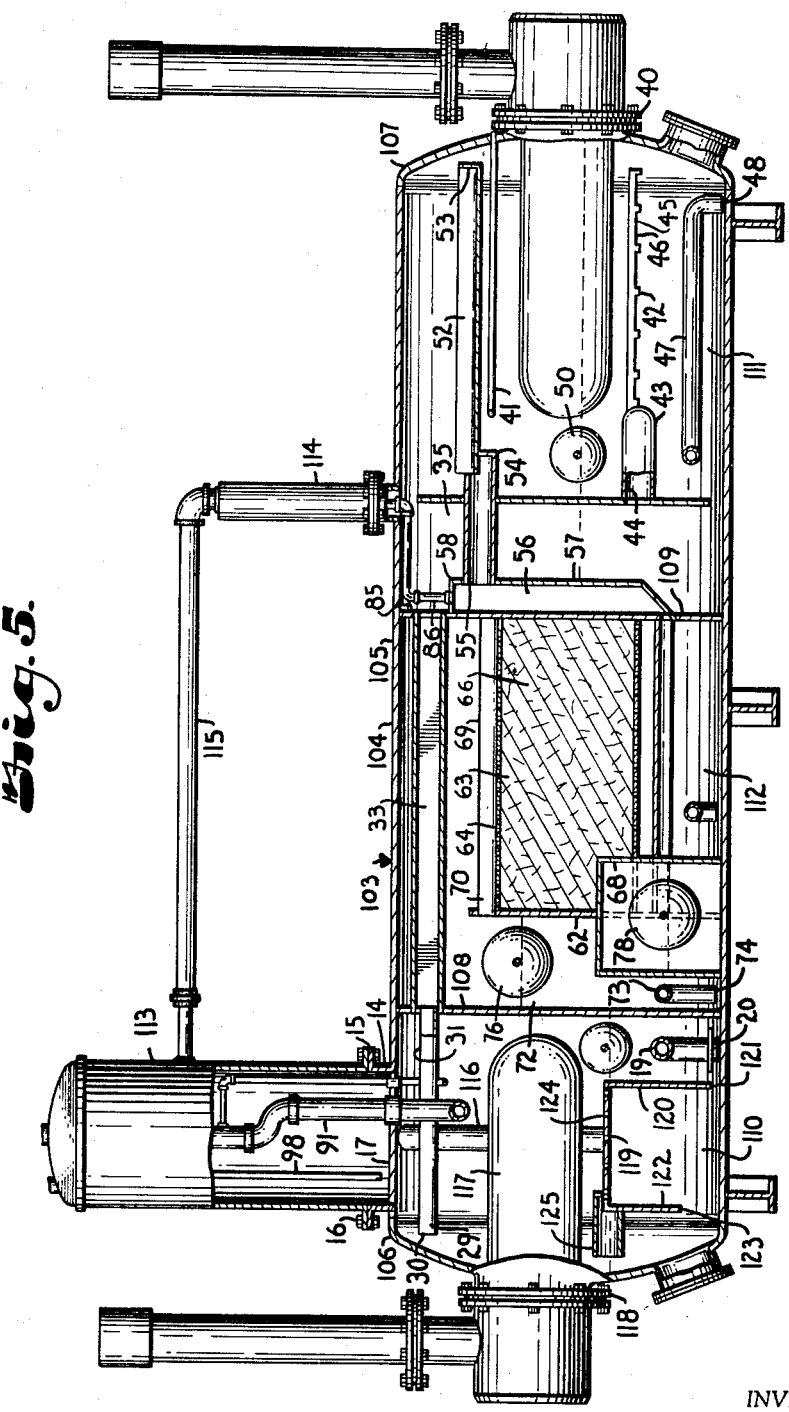

Patented July 30, 1968

3,394,530
HORIZONTAL EMULSION TREATER
David J. O'Neill and Vernon Leikam, Great Bend, Kans., assignors to O'Neill Tank Company, Inc., Great Bend, Kans., a corporation of Kansas
Filed May 9, 1966, Ser. No. 548,701
8 Claims. (Cl. 55—166)

ABSTRACT OF THE DISCLOSURE

A three-compartment, horizontal treater with a gas separator thereon delivers oil-water mixture from the gas separator to a first compartment under a spreader to allow free water to settle out and be removed directly from this compartment. The liquid mixture with reduced water content is conveyed through flow passages from the upper portion of the first compartment to a second compartment beneath a heater; the oil-water interface is maintained therein at the lower portion of the heater. Flow passages convey the oil from the upper portion of the second compartment and deliver it to a third compartment under a coalescer, the oil rising into the coalescer and overflowing into a collecting section. Float control water draw-offs maintain the water level in each compartment at a predetermined level.

---

This invention relates to new and useful improvements in method and means for treating oil well production and is particularly concerned with the processing of such oil well production in the field for separating said production into oil, water, and gas.

The amount of the different fluids in oil well production vaires, however, usually even though there is freely separable water and oil, there are also combinations in the form of emulsions that require heat to break and separate. The present invention is directed primarily to a heater type of treater preferably of the horizontal type for large capacity. In such treaters one of the problems is to provide sufficient heat for the required separation and also the cost in the heating of the production to the necessary temperatures. This problem becomes even greater when there is a large water content of the production. There are also problems in the prevention of the loss of lighter hydrocarbons into gas when they are recoverable or liquefiable at ambient conditions. Horizontal treaters present problems in treating the production as it is a mixture of fluids which have a natural tendency to separate from each other in vertical directions and the fluids must be moved horizontally in the treater while using the natural tendency to vertically separate.

The principal objects of the present invention are: to provide a well production treater and method wherein there is a low temperature separation of gas and free water adjacent the inlet portion of the treater before materially heating any of the production thereby reducing the heat required; to provide such a treater and method wherein free gas is separated from the liquid of the well streams and said liquids released for downward flow adjacent the inlet end of the treater in a low temperature water knock out or separation section or compartment; to provide such a structure wherein the liquids are dispersed for spreading generally horizontally in the water knock out section whereby the heavier water will settle and the oil and emulsions will rise effecting a stratification of the oil, emulsion, and free water; to provide such a treatment and apparatus wherein liquids of the production from the upper stratus and the water knock out compartment is removed and flowed horizontally to a downcomer or passage for the delivery to the lower part of a second separating compartment; to provide such a structure wherein the free water knock out compartment is at one end of the horizontal treater and the second separating compartment is at the other end; to provide the second separating section with a heat source to heat the portions of the production therein whereby the lighter ends will rise and water will settle resulting in stratification of oil, emulsion, and any water with the interface of the water and emulsion being substantially at the lower portion of the heating source; to provide a horizontal treater with a coalescing section generally between the end compartments of the treater; to provide for removal and flow of oil and emulsion from a stratus in the upper portion of the heating zone of the second settling compartment and flow thereof through a downcomer or passage to below the coalescing section and effecting distribution therein for coalescing and separation of its oil and water while moving in the coalescing section; to provide such a treater with water and oil interface responsive structure communicating with the lower portions of the respective compartments for drawing off water therefrom and maintain the level of a water and oil or water and emulsion interface; to provide such a treater with collecting and flow passages for fractions of all gaseous hydrocarbons released from the heated liquids and the moving of same into heat exchange relation with the inlet stream to condense the fractions which can be held at a liquid at ambient conditions and return the condensate to the liquid fractions; to provide an oil well production treating system wherein the production is discharged into a separator section, the gas fraction removed, and liquid portions delivered to a separator chamber of an elongate horizontal treater vessel with sufficient residence time to permit stratification of the oil and emulsion in a stratus and free water in a separate stratus with removal of the oil and emulsion from the upper stratus of said first compartment and flowing same horizontally in heat exchange relation with gaseous fractions in a compartment above the coalescing section and flowing the said liquids downwardly and distributing same in a lower portion of a second settling compartment for resulting stratification while applying heat to the liquids in said second compartment and flowing the liquids from the upper stratus of the second compartment and effecting distribution of the liquids in the lower portion of the coalescing section to effect coalescing of the oil and water while flowing upwardly in said coalescing section and flowing the oil from the coalescing section to a collector station from which it is drained under control of a level control means, water being drained from each of the compartments and coalescing section under control of water and oil or oil and emulsion interface responsive mechanisms; and to provide an oil production treater utilizing separating tendencies in vertical directions and horizontal flows to effect stratification and separation of water, oil, and gas with an efficient use of heat.

Other objects and advantages of this invention will become apparent from the following description taken in connection with the accompanying drawings wherein are set forth by way of illustration and example certain embodiments of this invention.

FIG. 2 is a vertical transverse sectional view through the treater taken on line 2—2, FIG. 1.

FIG. 3 is a vertical transverse sectional view through the treater on the line 3—3, FIG. 1.

FIG. 4 is a vertical transverse section view through the treater taken on the line 4—4, FIG. 1.

FIG. 5 is a diagrammatic sectioned side elevation of a modified form of treater.

Figure 1:
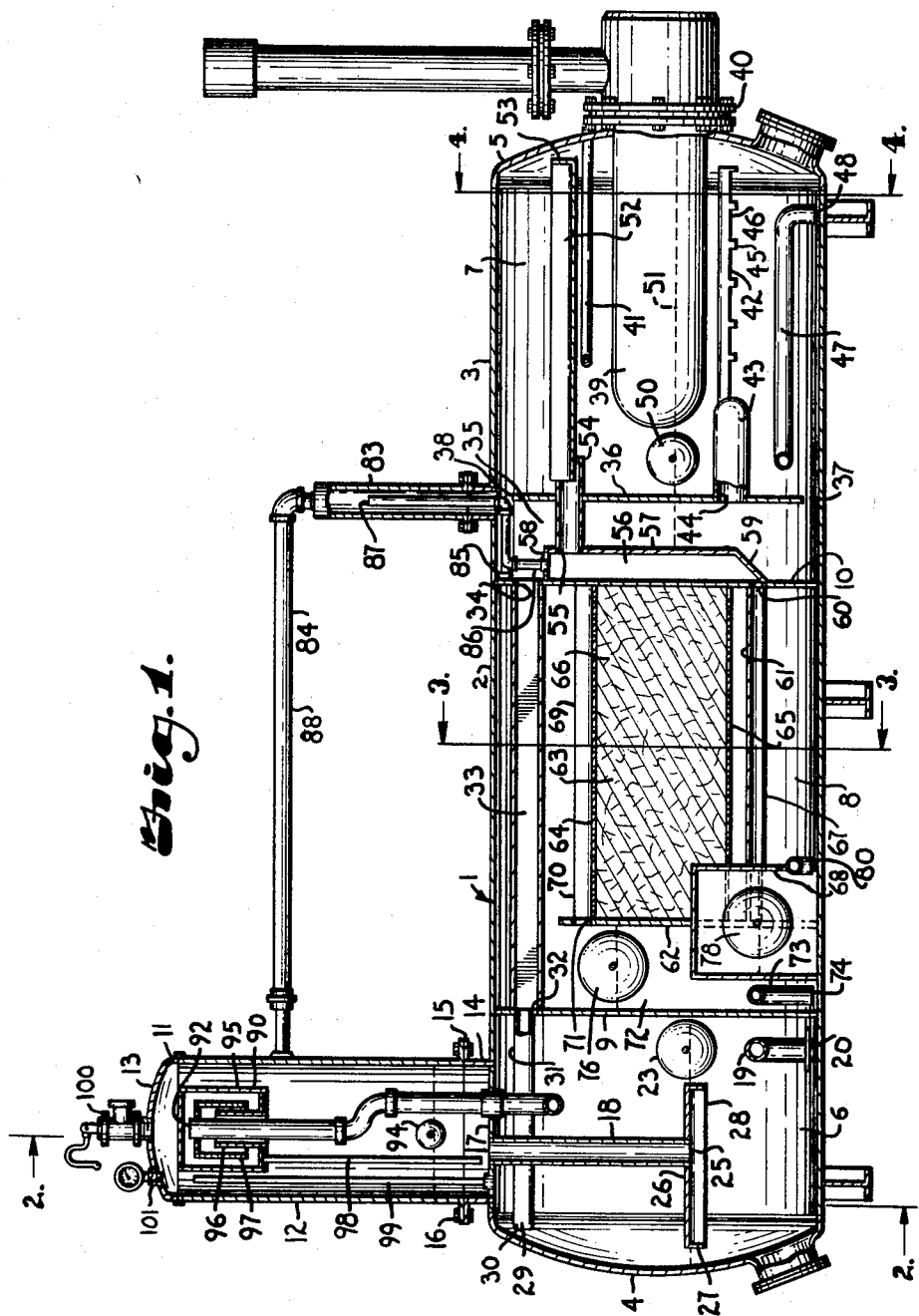
FIG. 1 is a diagrammatic sectioned side elevation of a treater embodying the features of the present invention.

Referring more in detail to the drawings:

The reference numeral 1 generally designates an oil well production treater which includes an elongated tank or vessel 2 extending horizontally and preferably having a cylindrical wall or shell 3 with its ends closed by domed heads 4 and 5 respectively. The treater illustrated in FIGS. 1 to 4 inclusive has the vessel 2 arranged with three principal compartments with the first compartment 6 in the end portion adjacent the head 4, a second compartment 7 in an end portion adjacent the head 5, and a third compartment 8 formed within said shell 3 by longitudinally spaced transverse partitions 9 and 10 that separate the third compartment from the first compartment and the second compartment respectively.

The treater includes a separator section 11 which, in the illustrated structure, is a vertically extending shell 12 closed at its upper end by a domed head 13 with its lower end connected to the horizontal vessel. In the structure illustrated the separator 11 is positioned over the first compartment 6 with the shell 3 having an upstanding flanged extension 14 to which the shell 12 is connected by the flange 15 and suitable fastening devices such as bolts 16. The portion of the shell or wall 3 within the extension 14 forms a bottom 17 to the separator section 11 with the interior of the separator section having communication with the interior of the first compartment by duct or flow means 18 for flow of liquids from the separator section 11 to the first compartment as later described.

Before considering the piping for the incoming well stream and separation of gas the specific structure within the first compartment 6 will be described. The compartment 6 should be elongate longitudinally of the vessel 2 whereby it has capacity that the liquids delivered thereto will have sufficient residence time to permit stratification of the oil and emulsion in an upper stratus and free water in a separate or lower stratus. A water draw-off from said compartment 6 is provided and in the illustrated structure includes a water outlet conduit 19 that extends into the shell 3 and has an inlet 20 adjacent the bottom of the compartment 6. Flow through the conduit 19 is regulated by a float valve 21 having a connection 22 with a float ball 23 in the compartment 6 and responsive to the interface 24 between the water stratus and the oil and emulsion stratus.

The flow means 18 extends downwardly in the compartment 6 and opens as at 25 below a spreader plate 26. The spreader plate is preferably substantially on the level of the interface 24, said plate being curved transversely and having end flanges 27 whereby there is a peripheral lower edge 28 and the liquid must flow under the spreader and lower edges 28 thereof. The periphery of the spreader is spaced from the float ball 23 and from the walls defining the compartment 6 whereby the lighter liquids consisting of the oil and emulsion can move upwardly in the compartment with the water settling to the bottom. A collector 29 is positioned in the upper portion of the compartment 6 to receive the liquid of the upper stratus in the uppermost portion of the compartment. In the structure illustrated there are a pair of trough like members each having a closed end 30 adjacent the head 4 and extending to the partition 9. The upper edges 31 of the troughs form weirs over which the oil and emulsion flow and then move along the trough toward the partition 9. The partition 9 has openings 32 corresponding to the shape of the interior of the troughs for passage of the oil and emulsion therethrough and into a longitudinally extending flow duct 33 that extends through the upper portion of the third compartment 8, said duct 33 having a discharge opening 34 communicating with a downcomer or passage 35 as later described.

The downcomer or passage 35 is defined by a partition 36 extending transversely in the shell 3 in longitudinally spaced relation to the partition 10. The partition 36 is preferably spaced from the bottom of the shell as at 37 to provide communication between the lower portion of the downcomer and the remainder of the compartment 7.

The partition 36 is also preferably spaced from the top portion to provide a communicating opening 38 for pressure equalization between the downcomer and the remainder of the compartment 7.

Heat to raise the temperature of the liquids in the compartment 7 is supplied by heat source, for example, a large fire tube 39 extends through a connection 40 in the end head 5 and longitudinally into the second compartment 7. In the illustrated structure the fire tube 39 is of a return bend type of large capacity for heating the large volume of fluids passing through the compartment 7. It is of conventional design and while it could be fired by gas or oil, in the illustrated structure it is supplied by gas through a line 41 as later described. Also the fire is controlled from standard thermometer elements (not shown) inserted into the heated liquids. The details of the control system and the fuel supply to this fire tube is not shown. The fire tube 39 representing the heat source in the compartment 7 usually will be referred to simply as the heat source, however, in the structure illustrated, the fire tube is principally positioned in the upper stratus of oil and emulsion as latter described.

A liquid spreader assembly 42 is located below the heat source in compartment 7 in order to receive liquids from the downcomer or flow passage 35 and distribute them laterally under the heat source. In the structure illustrated a wide manifold member 43 is mounted on the partition 36 and has communication as at 44 with the downcomer or flow passage 35 and connected to the manifold and extending longitudinally therefrom are spaced spreader members 45 which in the illustrated structure are in the form of tubes with slots or openings 46 in the lower portion thereof so that the liquids will be dispensed laterally outwardly therefrom. It is preferred that the spreader be located below the heat source whereby the oil and emulsion will have to move upwardly thereby.

A water draw-off is provided and in the illustrated structure it is a water outlet conduit 47 that extends into the shell 3 adjacent the partition 36 then longitudinally whereby the opening 48 to the outlet is adjacent the bottom of the compartment 7 near the head 5. The flow through the conduit 47 is regulated by a float valve (not shown) having a connection 49 with a float ball 50 in the compartment 7 and responsive to the water level or interface 51 between the water and oil in the compartment 7 which interface is preferably near the lower portion of the heat source or tube 39. The float ball 50 preferably is positioned adjacent the partition 36 above the manifold member 43 and at the end of the fire tube whereby the upward flow around the tube does not influence the float ball. Any water collecting in the lower portion of the downcomer 35 of course can pass through the opening 37 to the opening 48 of the water draw-off but the distance is such that the draw-off will not tend to pull any of the lighter liquids through the opening 37 so that oil and emulsion will tend to pass through the manifold 43 and be dispersed laterally by the spreader 42.

A weir or collector member 52 extends longitudinally of the vessel 3 in the upper portion of the compartment 7 with the end adjacent the head 5 being closed at 53 so oil from the upper stratus will pass over the sides of the weir or collector and flow toward the partition 36 where the collector 52 communicates with an end of a tube 54 that extends through the partition 36 and across the downcomer 35 communicating as at 55 with a downwardly extending flow duct 56. The flow duct 56 is preferably formed by a wall 57 spaced from the partition 10 and connected by a top wall 58 to said partition below the flow members or duct 33. The sides of the flow duct or passage 56 are also closed and the lower end has a downwardly inclined wall 59 also connected to the partition 10 immediately below openings 60 therein whereby the oil will flow from the tubular member 54 downwardly in the duct 56 and through the openings 60 into the third compartment 8.

The openings 60 are immediately below one end of a spreader 61 which is a transversely curved arched plate that extends longitudinally of the compartment 8 from the partition 10. An upstanding wall member 62 is arranged in the compartment 8 between the partitions 9 and 10 and preferably having substantially greater spacing from the partition 10. A coalescing section 63 is arranged in the compartment 8 and extends between the partition 10 and wall 62 and the sides of the shell 3, said section having the top and bottom defined by foraminous members such as perforated plates 64 and 65 respectively. A fibrous filter media such as excelsior, hay or the like 66 fills the space in the coalescing section 63 whereby the heated emulsion or oil may be finally treated by this agglomerating or coalescing section. The perforated plate 65 is slightly spaced above the spreader 61 so that the emulsion and oil flowing outwardly under the side edges 67 of the spreader 61 will move upwardly and be dispersed across the bottom of the perforated plate 65. The end of the spreader remote from the partition 10 is secured to the wall 62 and a float housing 68. The oil and emulsion flowing upwardly in the coalescing section 63 results in the oil being coalesced and the water being coalesced with the coalesced water gravitating downwardly to the bottom of the compartment 8 and the coalesced oil passing upwardly through the perforated plate 64 to collect in a body and flow over edges 69 of a trough shaped collector 70 which extends longitudinally of the vessel 2 and communicates with an opening 71 in the wall 62 for flow to a oil collecting section 72 located between the wall 62 and a partition 9.

The oil collecting section 72 has an oil draw-off which consists of an oil outlet conduit 73 that extends into the shell 3 and has an inlet 74 adjacent the bottom of the section 72. Flow through the conduit 73 is regulated by a float valve (not shown) having a connection 75 with a float ball 76 in the oil collecting section 72 and responsive to the oil level to be substantially maintained therein.

In large diameter treaters there may be sufficient space below the coalescing section for a water interface control float, however, in the structure illustrated the treater is of a diameter wherein the space below the coalescing section is limited therefore a housing 68 is arranged at one side of the coalescing section 63 and oil collection section 72 in the wall 62 to house a float ball 78 which has a connection 79 with a float valve (not shown) in a water outlet conduit 80 that extends through the shell and has an inlet 81 adjacent the bottom of the compartment 8 under the coalescing section 63 whereby the flow through the conduit 80 is under control of the float valve with the ball 78. The housing has an opening 82 to communicate the interior of the housing 68 with the bottom of the compartment 8 under the coalescing section whereby the water will enter into the housing and actuate the float ball 78.

Light fractions or gaseous hydrocarbons released from the liquids in compartments 7 and 8 are collected and returned to the separator 11. The shell 3 is provided with a riser 83 communicating with the compartment 7 preferably substantially above the partition 36. The upper end of the riser communicates through a flow line 84 to the interior of the separator shell 12. A pipe 85 is secured to the partition 10 and communicates with the upper portion of the compartment 8 and another pipe 86 is connected to the top wall 58 of the flow passage 56 and has communication therewith, said pipes 85 and 86 each extending upwardly in the riser 83 and terminating at open ends as at 87 whereby any gaseous vapors from the liquids in compartments 7 and 8 move upwardly through the pipes 85 and 86 and riser 83 and flow through the line 84 to the interior of the shell 12.

In the illustrated structure a well stream inlet conduit 88 connects with the separator shell 12 midway the height thereof and flow from the conduit is turned by a baffle 89 whereby the well stream is directed substantially circumferentially within said separator section 11. A mist extractor 90 is located in the upper portion of the separator section and communicates with a gas outlet conduit 91 having an inlet opening 92 in the mist extractor and extending downwardly therefrom in the separator section 11 through the wall portion 17 and then outwardly through the shell 3. The gas outlet conduit 91 exteriorly of the shall has a float controlled valve 93 that regulates flow therethrough the valve being connected by linkage 93 to a float ball 94 in the separator section 11 spaced between the baffle 89 and the wall portion 17 whereby the gas outlet is opened only when liquids of the well stream are below a predetermined level in the separator section 11. This restricting of the gas outlet prevents flooding of the section 11 and escape of liquid through the gas line 91. It also prevents loss of pressure through the gas outlet. The liquid in the separator section 11 maintains contact of the gaseous fractions with the liquid including those fractions that return to the separator through the pipe 84 whereby all of said fractions that can be held as a liquid will be carried by the liquid into the treater vessel 3.

The mist extractor 90 has an outer member 95 in the form of a closed tank like member with a central tubular member 96 open at the bottom and arranged therein concentrically with the upper portion of the gas outlet pipe 91. The upper end of the tubular portion 96 opens into an inverted cup-like member 97 which has an open bottom, the upper portion of the member 97 being secured to the upper end of the gas outlet pipe 91 whereby gas can enter through the interior of the tube 96, turn downwardly in the cup member 97 and then turn upwardly in the member 95 to the inlet opening 92 of the outlet pipe 91. Any condensate that tends to collect in the bottom of the member 95 of the mist extractor will flow downwardly through a condensate tube 98 which opens in the lower portion of the separator section 11 below the level of the liquid therein. A vent tube 99 provides communication from the upper part of the compartment 6 to the upper part of the separtaor section 11. The separator section 11 preferably has a pressure relief valve 100 in the head wall 13 as in conventional practice. Also a pressure gage may be connected to the separator section as by the fitting 101.

In operating a treater constructed as shown and described the fuel line 41 is connected to the gas outlet pipe 91 preferably inside the vessel or closely adjacent to the exterior thereof, said fuel pipe extending into the heated compartment 7 and then to the burner to supply the heater source with fuel. The well stream is then discharged through the conduit 88 to the separator section 11 where it moves circumferentailly with gaseous portions moving upwardly through the mist extractor 90 and the liquids moving downwardly onto the wall 17, said liquids flowing through the flow passage 18 into the compartment 6 below the spreader plate 26. The liquids have residence time whereby the water and the oil and emulsion will stratify with the water being at the bottom of the compartment 6. the oil and emulsion being in the upper stratus. As the water level rises the float ball 23 will actuate the valve 21 to draw off some of the water to maintain the interface 24. The gas in the separator 11 will collect and will provide some pressure tending to force the liquids through the flow passage 18 into the compartment 6, however, if the liquid level in the separator 11 raises beyond a predetermined level the gas outlet 91 is closed by the valve 93 in response to the float ball 94 being lowered. The oil and emulsion from the upper stratus in the compartment 6 is drawn off by the collector 29 and flows through an elongate passage 33 in the upper portion of compartment 8 where it is in heat exchange relation with any gaseous vapors in said compartment 8 tending to condense said vapors to return same to the oil at the top of the coalescing section 63. Any uncondensed vapors from section 8 flows through the pipe 85, riser 83 and pipe 84 to the separator section 11. Vapors in the upper portion of compartment 6 are vented to the upper part of the separator section 11 through the vent pipe 99. The liquids from the flow passage 33 flow downwardly in the downcomer or passage 35 and any free water can go to the bottom and move through the opening 37. Oil and emulsion will flow through the manifold member 43 and under the spreaders 42 and then laterally outwardly under the heater source 39 in compartment 7. The liquids again stratify with the water being at the lower stratus and the oil and emulsion moving to the upper stratus, the interface being adjacent the lower portion of the heater source so that the principal heating is in the oil and emulsion for maximum benefit thereof. The water collected in the bottom of the compartment 7 is drawn off through control of the float valve by the float ball 50 to maintain the level of the interface. Oil emulsions move over the edges of the collector trough 52 and flow therefrom through the tubular member 54 to the down duct 56 where these heated oils are in heat exchange relation with the coalescing section 63 and also the liquids flowing downwardly in the downcomer 35. The oil and emulsion in the passage 56 are delivered to the compartment 8 under the spreader 61 where they are dispersed over the lower part of the coalescing section and move upwardly therein, the coalesced water settling to the bottom, coalesced oil moving to the top and flowing over the edges of the collector trough 70 and being discharged into the collector section 72. The oil being drawn off through the oil drawn-off conduit 73 under control of the float ball 76. The water collecting in the compartment 8 is drawn off through the conduit 80 through the operation of the float ball 78. Any gaseous vapors in the compartment 7 or in the down flow passage 56 are returned through the riser 83 and pipe 84 to the separator section 11 where it is contacted by the incoming well stream for return of any portions thereof to the liquid. With this method and apparatus, maximum use of the heat is provided, water is eliminated as quickly as possible at all portions to reduce the volume of the liquids being handled in the system and to reduce the amount of treatment and the expense thereof that would otherwise be applied to the water. Furthermore, the arrangement of the longitudinal flow passages are such that the pressures in the compartment and the liquid heads will maintain the flows, however, if for any reason the liquid draw-off should fail, there can not be any flooding whereby liquid would pass through the gas outlet line as the float actuated valve 93 would close and prevent such discharge.

FIG. 5 illustrates a modified form of treater generally designated 103 which consists of a horizontal vessel 104 having a shell or wall 105 with ends closed by heads 106 and 107 respectively. The treater vessel is provided with transverse partitions 108 and 109 generally dividing the vessel into three compartments 110, 111, and 112. The compartment 110 being the first compartment and located between the head 106 and partition 108. The second compartment 111 is between the partition 109 and the head 107 and the third compartment 112 is between the partitions 108 and 109. The treater also has a separator section 113 positioned substantially over the first compartment 110 and connected to the compartment 111 by means of a riser 114 and pipe 115. The structure arrangement and operation of the separator section substantially corresponds to that of the separator section 11 of the form of invention illustrated in FIGS. 1 to 4 inclusive and the structure arrangement and operation of the structure in compartments 111 and 112 substantially correspond to the structure and operation in compartments 7 and 8 respectively of the structure shown in FIGS. 1 to 4 inclusive and corresponding members of the parts are utilized in FIG. 5.

In the structure shown in FIG. 5 the well stream is delivered to the separator section 113 and liquids collecting therein on the bottom wall 17 flow downwardly through flow passages or ducts 116 that are laterally spaced wherein there is one on each side of a heat source 117. The heat source is a large fire tube that extends through a connection 118 in the end head 106 and longitudinally into the first compartment 110. The fire tube is of a return bend pipe of large capacity for heating the large body of fluids passing through the compartment 110. It is of conventional design and may be fired with gas or oil, however, it is preferred that it be fired with gas and controlled from standard thermometer elements inserted into the heated liquids. The details of the control system and fuel supply of this heater tube is not shown. In the illustrated structure the fire tube 117 is principally positioned in the oil and emulsion stratus as later described. The ducts 116 extend through a spreader plate 119 that extends transversely of the vessel 104. This spreader plate has a depending wall 120 at the end toward the partition 108 which wall extends toward the bottom of the vessel and is spaced therefrom to provide an opening 121 for movement of liquids thereunder. The wall 120 is spaced from the partition 108 to provide for a float and water draw-off which float and water draw-off utilizes a float control valve which corresponds to the draw-off conduit 19, float valve ball 23, and a connected structure as illustrated and described relative to the structure shown in FIGS. 1 to 4 inclusive. The spreader plate 119 has a depending wall 122 toward the end head 106 with a lower edge 123 spaced substantially from the bottom of the vessel. The plate 119 has a plurality of perforations 124 in the portion between the two legs of the fire tube and laterally outwardly therefrom whereby there is upward flow around the fire tubes. Also the portion of the plate 119 under the fire tubes has communication with tubular members 125 that extend to and open adjacent the end head 106 whereby oil and emulsion is directed toward said end head for upward movement around the fire tube. The valve float ball 23 is arranged in compartment 110 whereby the interface between the water and oil and emulsion is substantially at the level of the plate 119. This provides substantial spreading and stratification whereby the water remains at the bottom and the oil and emulsion rising by the fire tube has maximum utilization of the heat. The oil and emulsion in the upper stratus is drawn off and removed through a collector 29 for further treatment in the treater in the same manner as the oil and emulsion was treated in the compartments 7 and 8 of the structure shown in FIGS. 1 to 4 inclusive.

The form of the invention illustrated in FIG. 5 is particularly adapted for areas where, due to cold temperatures and character of the oil well production, heat is desirable or necessary throughout the treating and separation, however, in the first compartment 110 the water that is separated therefrom can quickly move to the bottom and be drawn off whereby there is a minimum of the heat expended thereon with the heat being primarily utilized for the treatment of the emulsions and oil. Also the arrangement is such that the coalescing section is located between the heated end compartments so that said coalescing section is indirectly heated and thereby kept operable flowable condition facilitating the separation of the water from the oil.

It is to be understood that while we have illustrated and described certain forms of our invention it is not to be limited to the specific forms or arrangements of the parts herein described and shown except insofar as such limitations are included in the claims.

What we claim and desire to secure by Letters Patent is:
1. An oil well production treater including,
 (a) an elongated and horizontally extended shell,
 (b) a first compartment within the shell,
 (c) a spreader means substantially horizontally dis- posed in said compartment at a predetermined level therein, (d) conduit means through said shell communicating with said spreader means for flow of liquid components of an oil well production under said spreader means whereby the water and oil emulsion components will stratify in said first compartment with free water settling to the bottom thereof, (e) water draw-off means communicating with the bottom portion of said first compartment, (f) means responsive to a level of interface of said oil emulsion and water for controlling said water draw-off means to withdraw water from said compartment, whereby said interface responsive means maintains said interface substantially at the level with the spreader means, (g) a second compartment within the shell, (h) a heat source of large capacity mounted in said second compartment, (i) means including flow passages for removing oil and emulsion from the upper portion of said first compartment and permitting flow thereof longitudinally of the shell and delivering same to the lower portion of the second compartment under the heat source, means dispersing said oil and emulsion in said second compartment under the heat source whereby the heat thereof facilitates resolving of water from the oil and emulsion and effecting a stratification of the oil and emulsion and water therein, (j) a third compartment within the shell, (k) a coalescing section in said third compartment, (l) means removing oil and emulsion from the upper portion in the second compartment and flowing same downwardly and delivering same under the coalescing section in the third compartment, means dispersing said oil and emulsion under said coalescing section for upward flow therethrough whereby water settles to the bottom of said third compartment and oil moves to the top of said coalescing section, (m) means for removing water from the lower portion of said second and third compartments, (n) an oil collecting section adjacent said coalescing section for receiving oil overflowing from the upper portion of said coalescing section, (o) and means for removing oil from said oil collecting section.

2. An oil well production treater as set forth in claim 1 including, (a) a separator section associated with said shell for receiving an oil well production whereby said separator section separates the gaseous components from the liquid components thereof, (b) said conduit means communicating with said first compartment connecting with said separator section for flow of the liquid components therefrom.

3. An oil well production treater as set forth in claim 1 wherein said means for removing the water from the lower portion of the second and third compartments includes, (a) a water draw-off means communicating with the lower portion of said second compartment, (b) and means responsive to the interface of oil emulsion and water in the second compartment controlling the water draw-off means and removal of water to substantially maintain said interface near the lower portion of said heat source.

4. An oil well production treater as set forth in claim 2 including, (a) means communicating the separator section with the upper portions of the first, second, and third compartments for conducting gaseous vapors therefrom to said separating section for mixing with the incoming well stream.

5. An oil well production treater as set forth in claim 3 wherein the means for removing water from the third compartment includes an interface responsive means controlling the removal of said separated water to maintain the interface substantially at the level of the liquid dispersing means under the coalescing section.

6. An oil well production treater as set forth in claim 2 wherein the separator section is positioned over the first compartment and includes, (a) a gas outlet duct with a mist extractor at the inlet end thereof located in the upper portion of the separator section, (b) means responsive to liquid level in the lower portion of said separator shutting off flow of gas therefrom in response to rise of the level above a predetermined level in the separator, (c) said mist extractor having a condensate conduit for conducting condensate to the lower portion of said separator for flow with liquids into the first compartment.

7. An oil well production treater as set forth in claim 3 wherein, (a) said first compartment is adjacent one end of said shell, (b) said second compartment is adjacent the other end of the shell, (c) said third compartment being between said first and second compartments, (d) transverse partitions in the shell between the third compartment and the first compartment and the third compartment and the second compartment.

(e) a transverse wall in a third compartment extending from the bottom thereof to the top of the coalescing section with a coalescing section between said wall and one of said transverse partitions and the space between said wall and the other partition defining the oil collecting section.

8. An oil well production treater as set forth in claim 7 wherein a heat source of large capacity is mounted in said first compartment above the liquid dispersing spreader therein whereby oil and emulsion passes said heat source in a movement to the upper portion of said compartment.

References Cited

UNITED STATES PATENTS

| 2,706,531 | 4/1955 | Lovelady et al. | 210—187 |
| 2,713,919 | 7/1955 | Walker et al. | 210—187 |
| 2,726,729 | 12/1955 | Williams | 210—187 |
| 2,825,422 | 3/1958 | Schoenfeld | 210—180 |
| 3,312,044 | 4/1967 | McCarter. | |

DELBERT E. GANTZ, *Primary Examiner.*

G. J. CRASANAKIS, *Asistant Examiner*